United States Patent
Sugiyama

(10) Patent No.: US 7,762,562 B2
(45) Date of Patent: Jul. 27, 2010

(54) VEHICLE ATTITUDE CONTROL APPARATUS

(75) Inventor: Mizuho Sugiyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 937 days.

(21) Appl. No.: 11/578,609

(22) PCT Filed: Mar. 24, 2005

(86) PCT No.: PCT/JP2005/006212

§ 371 (c)(1),
(2), (4) Date: Oct. 16, 2006

(87) PCT Pub. No.: WO2005/102762

PCT Pub. Date: Nov. 3, 2005

(65) Prior Publication Data

US 2008/0029987 A1 Feb. 7, 2008

(30) Foreign Application Priority Data

Apr. 20, 2004 (JP) .............................. 2004-124185

(51) Int. Cl.
- B62D 9/02 (2006.01)
- B60G 21/00 (2006.01)
- G05D 1/08 (2006.01)
- B60V 1/11 (2006.01)

(52) U.S. Cl. .............. 280/5.509; 280/5.506; 280/5.507; 280/5.502; 701/1; 180/118

(58) Field of Classification Search ................. 180/118, 180/6.48, 233; 701/1, 26; 280/5.502, 5.5, 280/5.506, 5.507, 5.509
See application file for complete search history.

(56) References Cited

U.S. PATENT DOCUMENTS 5,058,017 A * 10/1991 Adachi et al. .................. 701/38
5,869,943 A 2/1999 Nakashima et al.

(Continued)

FOREIGN PATENT DOCUMENTS

DE 197 46 889 A 1 5/1998

(Continued)

Primary Examiner—Lesley Morris
Assistant Examiner—Daniel Yeagley
(74) Attorney, Agent, or Firm—Oliff & Berridge, PLC

(57) ABSTRACT

A vehicle attitude control apparatus has suspensions Sfl, Srl, Sfr, and Srr that suspend each of front-left, rear-left, front-right and rear-right wheels Wfl, Wrl, Wfr, and Wrr; electric motors 21, 22, 23 and 24 that independently drive each of four wheels; lateral acceleration sensor 31; and controller 32. The controller 32 calculates the roll angle and roll direction of a vehicle body BD by using the detected lateral acceleration. Further, the controller 32 increases or decreases the driving torques generated by the electric motors 21 to 24 by a driving torque changing amount in accordance with the calculated roll angle and roll direction. With the increase or decrease in the driving torques generated by the electric motors 21 to 24 by the driving torque changing amount, downward force is generated on the vehicle body moving up upon the vehicle roll (at respective instant centers determined by the suspensions at the side where the vehicle body moves up), and upward force is generated on the vehicle body moving down upon the vehicle roll (at respective instant centers determined by the suspensions at the side where the vehicle body moves down).

4 Claims, 7 Drawing Sheets

U.S. PATENT DOCUMENTS

| | | | |
|---|---|---|---|
| 6,298,294 B1 | 10/2001 | Murata et al. | |
| 6,425,585 B1 * | 7/2002 | Schuelke et al. | 280/5.511 |
| 7,004,870 B2 * | 2/2006 | Kroppe | 475/86 |
| 7,066,560 B2 * | 6/2006 | Kato et al. | 303/140 |
| 7,640,081 B2 * | 12/2009 | Lu et al. | 701/1 |
| 2002/0023791 A1 * | 2/2002 | Kima et al. | 180/65.5 |
| 2004/0176899 A1 * | 9/2004 | Hallowell | 701/84 |
| 2004/0239179 A1 | 12/2004 | Kato et al. | |
| 2007/0138861 A1 * | 6/2007 | Kawahara et al. | 303/20 |

FOREIGN PATENT DOCUMENTS

| | | |
|---|---|---|
| DE | 100 29 010 A1 | 1/2001 |
| EP | 0 606 345 B1 | 6/1996 |
| EP | 1 547 853 A1 | 6/2005 |
| FR | 2 795 680 | 1/2005 |
| GB | 2 341 585 A | 3/2000 |
| JP | A 2-262806 | 10/1990 |
| JP | A 5-328542 | 12/1993 |
| JP | A 10-119743 | 5/1998 |
| JP | A 10-210604 | 8/1998 |
| JP | A 10-310042 | 11/1998 |
| JP | A 11-187506 | 7/1999 |
| JP | A 2001-30728 | 2/2001 |
| JP | A 2002-301939 | 10/2002 |
| JP | A 2002-316629 | 10/2002 |
| JP | A 2004-66938 | 3/2004 |
| JP | 2006130986 A * | 5/2006 |
| WO | WO 2004/012972 A1 | 2/2004 |

* cited by examiner

VEHICLE ATTITUDE CONTROL APPARATUS

BACKGROUND OF THE INVENTION

1. Field of the Invention

The present invention relates to a vehicle attitude control apparatus that suppresses a roll of a vehicle.

2. Description of the Related Art:

From in the past, as described in Japanese Patent Application Laid-Open (kokal) No. 2002-301939, for example, a vehicle provided with four electric motors (actuators) that independently drive each of four wheels is known. In this type of a vehicle, driving torques generated from four electric motors are independently controlled to enhance vehicle turning performance.

However, the above-described prior art does not give adequate consideration to the roll of the vehicle. Therefore, in order to suppress the roll of the vehicle, it is necessary to increase the spring constant of coil springs or to set the damping force of shock absorbers of the vehicle to a high value. This entails a problem that the ride comfort becomes poor.

SUMMARY OF THE INVENTION

The present invention is accomplished in view of the foregoing problem, and aims to provide a vehicle attitude control apparatus capable of enhancing ride comfort upon a roll by suppressing a vehicle roll through the independent control of driving torques generated by the actuators, represented by electric motors, corresponding to four wheels.

In order to achieve the foregoing object, a feature of the present invention is that a vehicle attitude control apparatus is provided with four actuators which independently drive four wheels suspended on a vehicle body by a suspension apparatus and can control vehicle running attitude through the independent control of driving torques generated by the four actuators. The vehicle attitude control apparatus comprises roll detecting means that detects a roll of a vehicle; and driving torque control means that produces a difference to the driving torques generated by the four actuators in accordance with the detected vehicle roll to thereby apply to the vehicle body force in the direction opposite to the roll.

The driving torque control means may produce a difference in the driving torques generated by the actuators, corresponding to the front and rear wheels at the side where the vehicle body moves up due to the vehicle roll, such that forces are generated in the front and rear wheels, at the side where the vehicle body moves up, in opposite directions with respect to the fore and aft direction of the vehicle so that downward force is generated at the vehicle body that moves up, or it may produce a difference in the driving torques generated by the actuators, corresponding to the front and rear wheels at the side where the vehicle body moves down due to the vehicle roll, such that forces are generated in the front and rear wheels, at the side where the vehicle body moves down, in opposite directions with respect to the fore and aft direction of the vehicle so that upward force is generated at the vehicle body that moves down.

The roll angle detecting means detects a vehicle roll angle, for example, and the driving torque control means may comprise, for example, changing amount calculating means that calculates a changing amount for changing the driving torques generated by the four actuators with the use of the detected roll angle of the vehicle body; driving torque calculating means that calculates the driving torques generated by the four actuators with the use of the calculated changing amount; and drive control means that drives and controls the four actuators in accordance with the calculated driving torques. In this case, the roll detecting means may comprise, for example, a lateral acceleration sensor that detects the lateral acceleration in the side-to-side direction of the vehicle; and roll angle calculating means that calculates the roll angle of the vehicle body in accordance with the detected lateral acceleration.

If a difference is produced in the driving torques generated by four actuators in accordance with the vehicle roll detected by the roll detecting means, force in the direction opposite to the roll can be applied to the vehicle body. Specifically, since four wheels are suspended on the vehicle body by the suspensions, force in the fore and aft direction of the vehicle generated by the front and rear wheels can be applied to the vehicle body via the suspensions by producing a difference in the driving torques generated by four actuators. Accordingly, the vehicle roll can be suppressed, whereby ride comfort upon the roll can be enhanced.

DESCRIPTION OF THE PREFERRED EMBODIMENT

Figure 1:
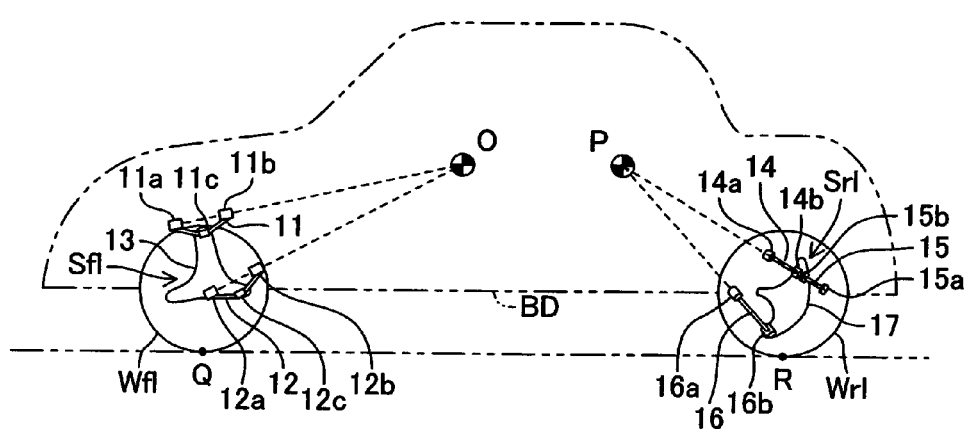
FIG. 1 is a schematic side view showing suspensions, seen from the inside, at front-right and rear-right wheels in a vehicle provided with a vehicle attitude control apparatus according to one embodiment of the present invention.

Below, one embodiment of the present invention will be described while referring to the drawings. FIG. 1 is a schematic side view showing front-right and rear-right wheels that are seen from the inside.

Figure 2:
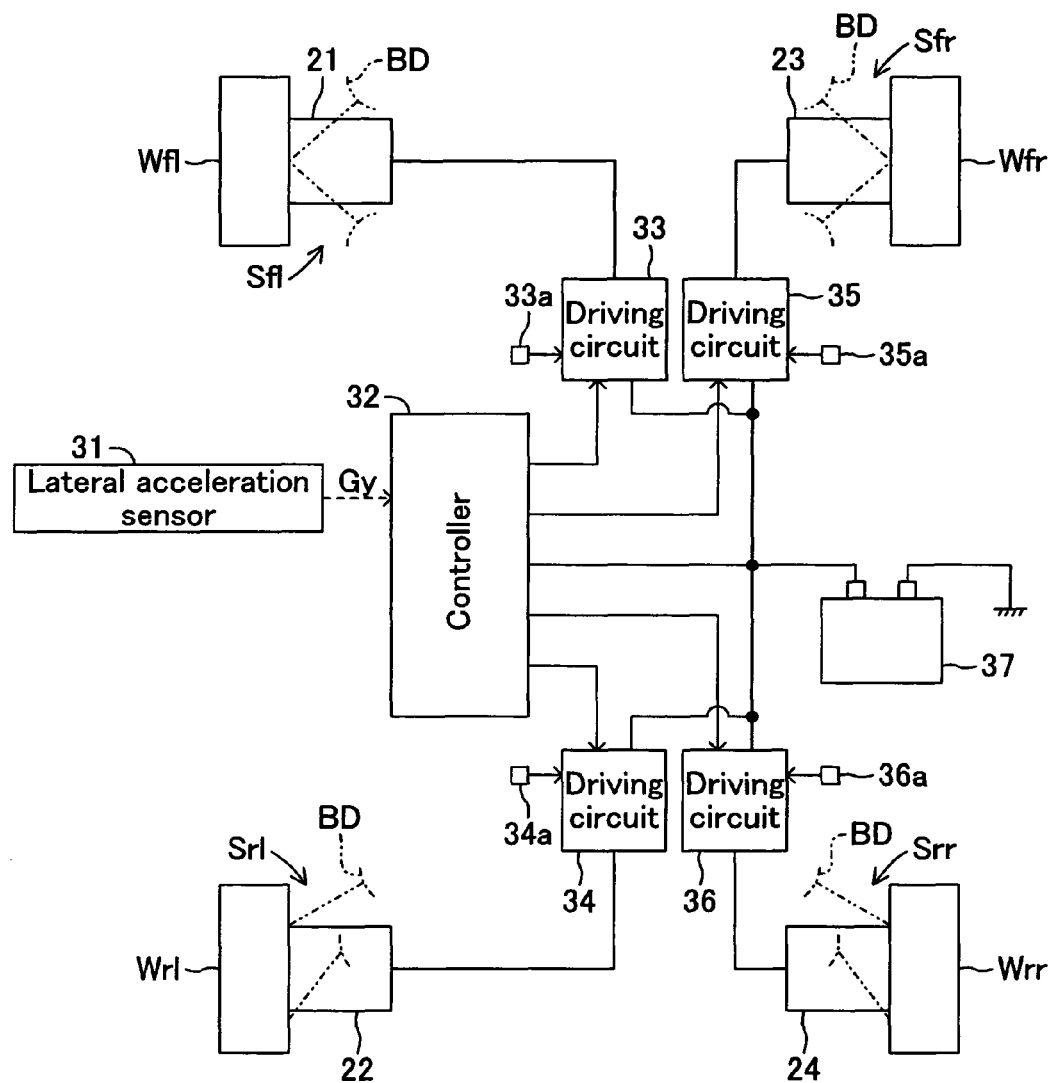
FIG. 2 is a block diagram of an electric control apparatus of the vehicle attitude control apparatus shown in FIG. 1.

The front-left, rear-left, front-right and rear-right wheels Wfl, Wrl, Wfr, and Wrr of the vehicle are suspended on a vehicle body BD by suspensions Sfl, Srl, Sfr, and Srr (see FIG. 2). The suspensions Sfl, Srl, Sfr and Srr have the same structure on the left and right sides of the vehicle, so only the suspensions Sfr and Srr positioned on the right side of the vehicle will be explained in detail, and a detailed explanation of the suspensions Sfl and Srl positioned on the left side of the vehicle will be omitted.

The front suspension Sfr includes an upper arm 11 and a lower arm 12. The upper arm 11 is rotatably mounted on the vehicle body BD at its inner ends 11a and 11b for rotation about an axis extending in roughly the fore and aft direction of the vehicle, and is rotatably mounted at its outer end 11c on a carrier 13 which supports the front-right wheel Wfr. The lower arm 12 is mounted on the vehicle body BD at its inner ends 12a and 12b for rotation about an axis extending in roughly the fore and aft direction of the vehicle body, and is rotatably mounted on the carrier 13 at its outer end 12c.

The axis of the inner ends 11a and 11b of the upper arm 11 and the axis of the inner ends 12a and 12b of the lower arm 12 intersect at an intersection point O that is positioned above and towards the rear of the vehicle body with respect to the ground contact surface Q of the front-right wheel Wfr. This intersection point O is the instant center of the front-right wheel Wfr with respect to the vehicle body BD. When, for example, force acts on the ground contact surface Q of the front-right wheel Wfr towards the front of the vehicle, force corresponding to the forward force acts at the intersection point O in the direction of line segment OQ connecting the intersection point O and the ground contact surface Q. In contrast, when force acts on the ground contact surface Q of the front-right wheel Wfr towards the rear of the vehicle, force corresponding to the rearward force acts at the intersection point O in the direction of line segment QO.

The rear suspension Srr includes upper arms 14 and 15 and a lower arm 16. The upper arms 14 and 15 are rotatably mounted on the vehicle body BD at their inner ends 14a and 15a, respectively, for rotation about an axis extending in roughly the fore and aft direction of the vehicle and are rotatably mounted at their outer ends 14b and 15b, respectively, on a carrier 17 which supports the rear-right wheel Wrr. The lower arm 16 is rotatably mounted on the vehicle body BD for rotation about an axis extending in roughly the fore and aft direction of the vehicle at its inner end 16a, and it is rotatably mounted on the carrier 17 at its outer end 16b.

The axis connecting the inner ends 14a and 15a of the upper arms 14 and 15 and the axis of the inner end 16a of the lower arm 16 intersect at an intersection point P which is located above and towards the front of the vehicle with respect to the ground contact surface R of the rear-right wheel Wrr. The intersection point P is the instant center of the rear-right wheel Wrr with respect to the vehicle body BD. When, for example, force acts on the ground contact surface R of the rear-right wheel Wrr towards the rear of the vehicle, force corresponding to the rearwards force acts at the intersection point P in the direction of the line segment PR connecting the intersection point P and the ground contact surface R. In contrast, when force towards the front of the vehicle acts on the ground contact surface R of the rear-right wheel Wrr, force corresponding to the forward force acts at the intersection point P in the direction of line segment RP.

As shown in FIG. 2, the rotational shafts of electric motors 21, 22, 23, 24 which are fixed to unillustrated wheel-side member are integrally mounted on the front-left, rear-left, front-right and rear-right wheels Wfl, Wrl, Wfr, and Wrr, respectively, of the vehicle. The electric motors 21, 22, 23, 24 have internal reduction gears, and the front-left, rear-left, front-right and rear-right wheels Wfl, Wrl, Wfr, and Wrr are independently driven by their rotation. The electric motors 21, 22, 23, 24 serve as actuators.

Next, an electric control apparatus that controls the driving torques of the electric motors 21, 22, 23, 24 will be described. This electric control apparatus includes a lateral acceleration sensor 31. The lateral acceleration sensor 31 detects lateral acceleration Gy in the lateral direction of the vehicle, and is connected to a controller 32. The lateral acceleration sensor 31 indicates that the rightward acceleration with respect to the vehicle is generated when the value thereof is positive, while it indicates that the leftward acceleration with respect to the vehicle is generated when the value thereof is negative. The lateral acceleration Gy may be calculated by using other vehicle motion states, instead of the lateral acceleration sensor 31. For example, a vehicle speed sensor for detecting a vehicle speed and a steering angle sensor for detecting a handle steering angle are provided, and the lateral acceleration Gy may be calculated from the detected vehicle speed and steering angle.

Figure 3:
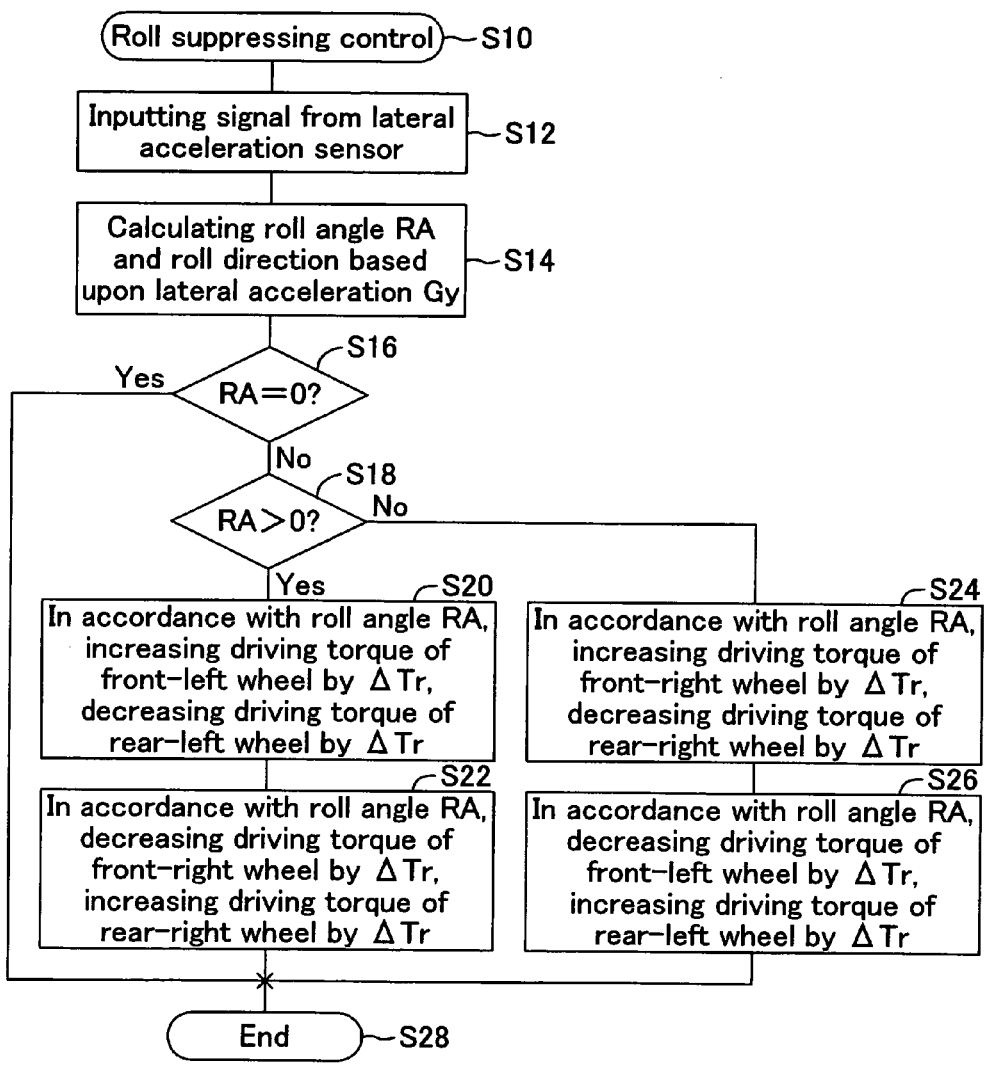
FIG. 3 is a flowchart showing a program executed by the controller of FIG. 2.

The controller 32 comprises a microcomputer having a CPU, a ROM, a RAM, and the like as principal components. The controller 32 controls the operation of the electric motors 21, 22, 23, 24 by executing the roll suppressing control program shown in FIG. 3. The controller 32 is connected to the drive circuits 33, 34, 35, 36 as well as to the accelerator sensor 31. Electric power is supplied from a battery 37 to the controller 32 and drive circuits 33, 34, 35, 36.

The drive circuits 33, 34, 35, 36 are respectively connected to current sensors 33a, 34a, 35a, 36a which sense the drive current flowing to the electric motors 21, 22, 23, 24 in accordance with the magnitude of the driving torque generated by the electric motors 21, 22, 23, 24. In response to instructions from the controller 32, the drive circuits 33, 34, 35, 36 control torque from the electric motors 21, 22, 23, 24 in cooperation with the current sensors 33a, 34a, 35a, 36a to drive the front-left, rear-left, front-right and rear-right wheels Wfl, Wrl, Wfr, and Wrr. When the vehicle body BD is not experiencing a roll, the controller 32 controls the electric motors 21, 22, 23, 24 such that each driving torque generated from the electric motors 21, 22, 23, 24 are generally equal to one another. Torque sensor for detecting driving torque of the front-left, rear-left, front-right and rear-right wheels Wfl, Wrl, Wfr, and Wrr may be provided instead of the current sensors 33a, 34a, 35a, 36a.

Next, the operation of the first embodiment having the above-described structure will be described. At prescribed short time intervals, the controller 32 repeatedly executes the roll suppressing control program shown in FIG. 3. The execution of this program begins in Step S10. In Step S12, a detection signal indicating the lateral acceleration Gy is inputted from the lateral acceleration sensor 31.

Figure 4:
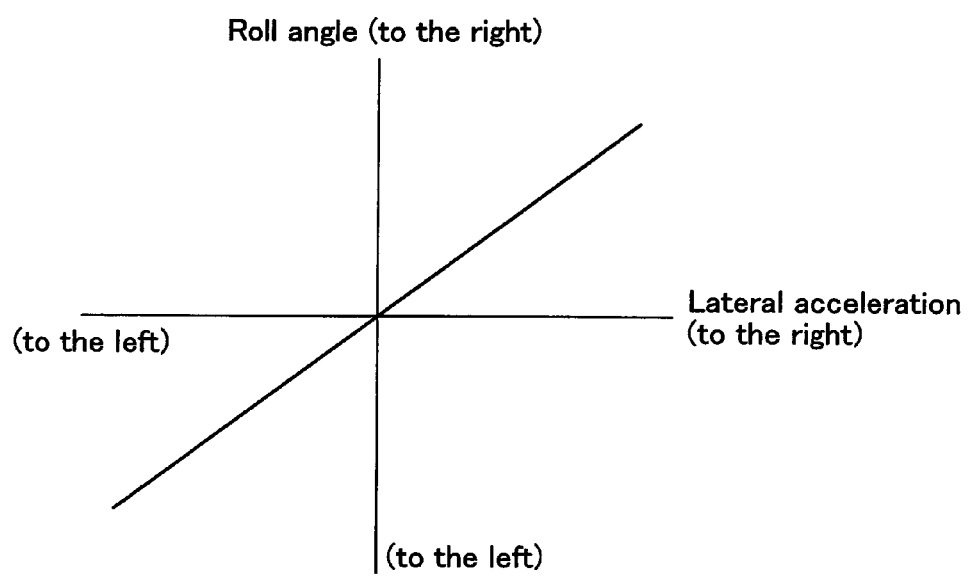
FIG. 4 is a graph showing the characteristic of change of the roll angle with respect to the lateral acceleration.

Next, in Step S14, the controller 32 refers to a roll angle table provided therein to calculate the roll angle RA and roll direction of the vehicle body BD on the basis of the lateral acceleration Gy inputted in Step S12. As shown in FIG. 4, the roll angle table stores the roll angle RA that proportionally increases with the increase in the lateral acceleration Gy from "0" to a predetermined positive value, and the roll angle RA that proportionally decreases with the decrease in the lateral acceleration Gy from "0" to a predetermined negative value. It is to be noted that the positive roll angle RA indicates that the vehicle body BD is rolled to the right, while the negative roll angle RA indicates that the vehicle body BD is rolled to the left.

After the process in Step S14, it is determined in Step S16 whether the roll angle RA is "0" or not. First, when the vehicle is traveling straight ahead on a flat road surface, the roll is not produced on the vehicle, so that "No" determination is made in Step S16 so as to end the execution of this program. With this state, the controller 32 controls the driving torque of the electric motors 21, 22, 23, 24 in cooperation with the driving circuits 33, 34, 35, 35 by the execution of the unillustrated program, thereby rotationally driving the front-left, rear-left, front-right and rear-right wheels Wfl, Wrl, Wfr, and Wrr.

Figure 6A:
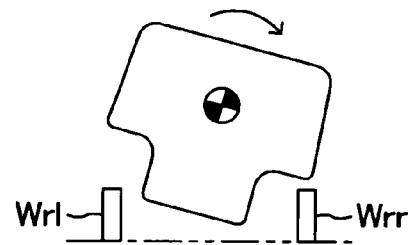
FIGS. 6A to 6D are schematic diagrams for explaining the attitude control upon the rightward roll of the vehicle.

Next, the case in which the vehicle traveling straight ahead starts to turn to the left will be explained. In this case, the rightward lateral acceleration Gy to the vehicle gradually increases with the leftward turn of the vehicle, resulting in that, as shown in FIG. 6A, the vehicle body BD starts to roll to the right. Therefore, the roll angle RA of the vehicle body BD assumes a positive value, so that "No" determination is made in Step S16 and "Yes" determination is made in Step S18 so as to execute the processes in Steps S20 and S22.

Figure 5:
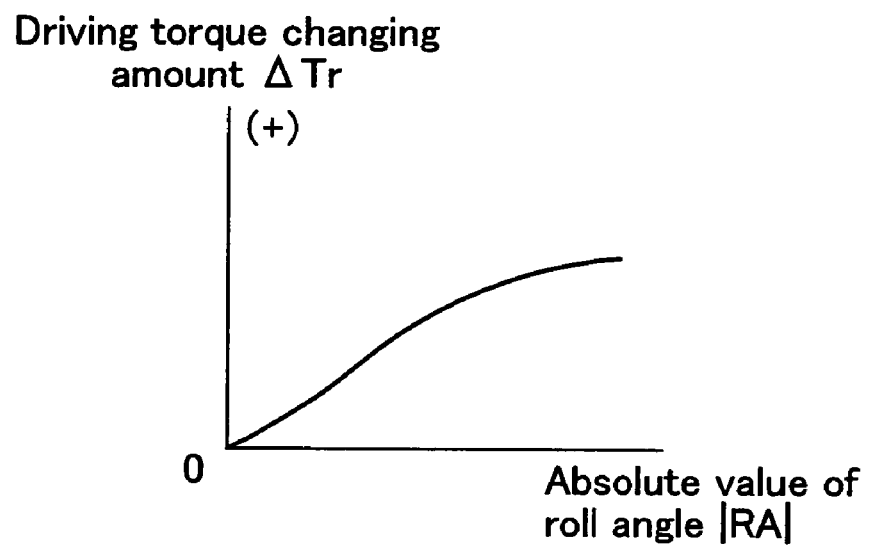
FIG. 5 is a graph showing the characteristic of change of the driving torque changing amount with respect to the roll angle.

In Step S20, the controller 32 refers to a driving torque changing table provided therein to calculate a driving torque changing amount ΔTr for changing the driving torque generated from the electric motors 21 and 22 corresponding to the front-left and rear-left wheels Wfl and Wrl by using the roll angle RA and roll direction of the vehicle body BD calculated in Step S14. As shown in FIG. 5, the driving torque changing table stores the driving torque changing amount ΔTr that gradually increases with the increase in the absolute value |RA| of the roll angle RA. After the calculation of the driving torque changing amount ΔTr, the controller 32 increases the driving torque generated by the electric motor 21 corresponding to the front-left wheel Wfl by the driving torque changing amount ΔTr, and decreases the driving torque generated by the electric motor 22 corresponding to the rear-left wheel Wrl by the driving torque changing amount ΔTr.

In Step S22, the controller 32 calculates the driving torque changing amount ΔTr for changing the driving torque generated by the electric motors 23 and 24 corresponding to the front-right and rear-right wheels Wfr and Wrr. In this case, in accordance with the roll angle RA of the vehicle body BD, the controller 32 decreases the driving torque generated by the electric motor 23 corresponding to the front-right wheel Wfr by the driving torque changing amount ΔTr, and increases the driving torque generated by the electric motor 24 corresponding to the rear-right wheel Wrr by the driving torque changing amount ΔTr.

Figure 6B:
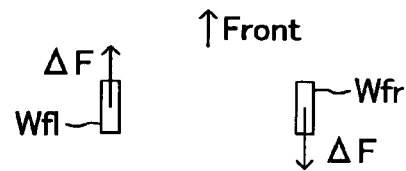

Accordingly, as shown in FIG. 6B, forces ΔF each having the same magnitude and being reverse to each other are applied in the fore and aft direction of the vehicle to the front-left wheel and rear-left wheel Wfl and Wrl at the inner locus of the turning direction, in accordance with the increase and decrease by the driving torque changing amount ΔTr. Further, forces ΔF each having the same magnitude and being reverse to each other are applied to the front-right wheel and rear-right wheel Wfr and Wrr in the fore and aft direction of the vehicle at the outer locus of the turning direction.

Figure 6C:
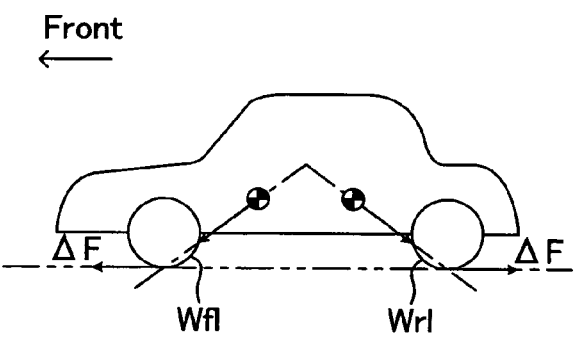
Figure 6D:
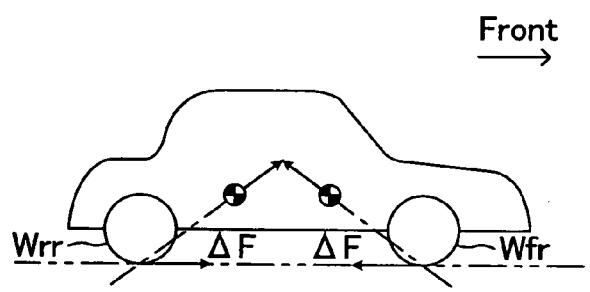

Thus, on the inner locus of the turning direction, i.e., at the left side where the vehicle body BD moves up by the roll of the vehicle, downward force is applied at the respective instant centers determined by the suspensions Sfl and Srl at the left side as shown in FIG. 6C. Further, on the outer locus of the turning direction, i.e., at the right side where the vehicle body BD moves down by the roll of the vehicle, upward force is applied at the respective instant centers determined by the suspensions Sfr and Srr at the right side as shown in FIG. 6D. As a result, the rightward roll of the vehicle body BD is suppressed. In this case, since the sum of the forces ΔF generated on the front-left, rear-left, front-right and rear-right wheels Wfl, Wrl, Wfr, and Wrr is "0", as viewed for the vehicle as a whole, so acceleration of the vehicle in the fore and aft direction is not produced, and the forces ΔF are in opposite directions for the front and rear as well as right and left of the vehicle, so a yawing moment is not produced in the vehicle.

After the process of Step S22, in Step S28, the execution of this program is temporarily ended. When the leftward turn of the vehicle continues, the processes of Steps S20 and S22 are repeatedly performed. As a result, the rightward roll of the vehicle body BD is suppressed, with the result that ride comfort upon the roll can be enhanced.

Figure 7A:
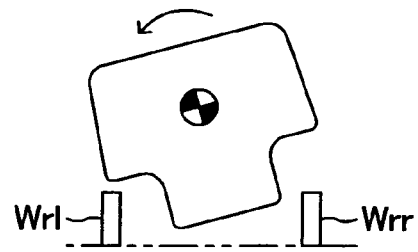
FIGS. 7A to 7D are schematic diagrams for explaining the attitude control upon the leftward roll of the vehicle.

Next, the case in which the vehicle traveling straight ahead starts to turn to the right will be explained. In this case, the leftward lateral acceleration Gy to the vehicle gradually increases with the rightward turn of the vehicle, resulting in that, as shown in FIG. 7A, the vehicle body BD starts to roll to the left. Therefore, the roll angle RA of the vehicle body BD assumes a negative value, so that "No" determination is made in Step S16 and Step S18 so as to execute the processes in Steps S24 and S26.

In Step S24, like the case of the previous Step S20, the controller 32 refers to a driving torque changing table provided therein to calculate a driving torque changing amount ΔTr corresponding to the absolute value |RA| of the roll angle BD of the vehicle body by using the roll angle RA and roll direction of the vehicle body BD calculated in Step S14. Then, the controller 32 increases the driving torque generated by the electric motor 23 corresponding to the front-right wheel Wfr by the driving torque changing amount ΔTr, and decreases the driving torque generated by the electric motor 24 corresponding to the rear-right wheel Wrr by the driving torque changing amount ΔTr.

In Step S26, the controller 32 decreases the driving torque generated by the electric motor 21 corresponding to the front-left wheel Wfl by the calculated driving torque changing amount ΔTr, and increases the driving torque generated by the electric motor 22 corresponding to the rear-left wheel Wrl by the driving torque changing amount ΔTr.

Figure 7B:
Figure 7B:

Accordingly, as shown in FIG. 7B, forces ΔF each having the same magnitude and being reverse to each other are applied on the front-right wheel and rear-right wheels Wfr and Wrr in the fore and aft direction of the vehicle at the inner locus of the turning direction, in accordance with the increase and decrease by the driving torque changing amount ΔTr. Further, forces ΔF each having the same magnitude and being reverse to each other are applied to the front-left wheel and rear-left wheel Wfl and Wrl in the fore and aft direction of the vehicle at the outer locus of the turning direction.

Figure 7C:
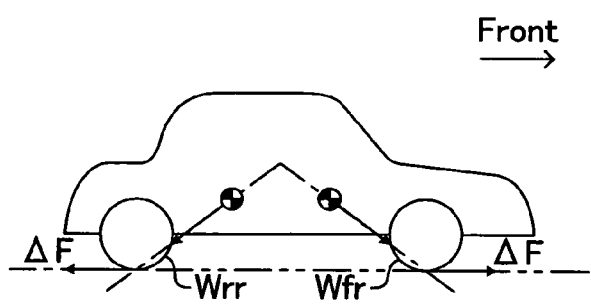
Figure 7D:
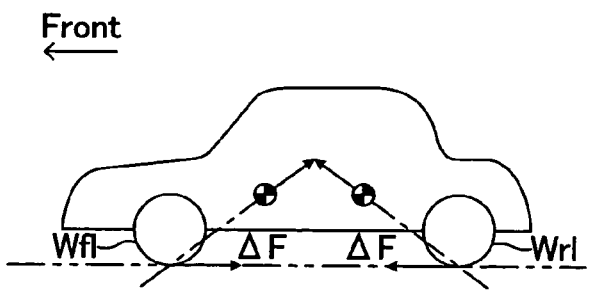

Thus, on the inner locus of the turning direction, i.e., at the right side where the vehicle body BD moves up by the roll of the vehicle, downward force is applied at the respective instant centers determined by the suspensions Sfr and Srr at the right side as shown in FIG. 7C. Further, on the outer locus of the turning direction, i.e., at the left side where the vehicle body BD moves down by the roll of the vehicle, upward force is applied at the respective instant centers determined by the suspensions Sfl and Srl at the left side as shown in FIG. 7D. As a result, the leftward roll of the vehicle body BD is suppressed. In this case, acceleration in the fore and aft direction of the vehicle and a yawing moment are not produced in the vehicle.

After the process of Step S26, in Step S28, the execution of this program is temporarily ended. When the rightward turn of the vehicle continues, the processes of Steps S24 and S26 are repeatedly performed. As a result, the leftward roll of the vehicle body BD is suppressed, with the result that ride comfort upon the roll can be enhanced.

Next, when the vehicle is not in the turning state but the vehicle body BD starts to roll to the right as shown in FIG. 6A because of the front-left and rear-left wheels Wfl and Wrl riding over an obstacle on the road surface, for example, the processes in Steps S20 and S22 are executed like the case in which the vehicle starts to turn to the left. Therefore, at the left side where the vehicle body BD moves up by the roll of the vehicle, downward force is applied at the respective instant centers determined by the suspensions Sfl and Srl at the left side as shown in FIG. 6C. Further, at the right side where the vehicle body BD moves down by the roll of the vehicle, upward force is applied at the respective instant centers determined by the suspensions Sfr and Srr at the right side as shown in FIG. 6D. Consequently, the rightward roll of the vehicle body BD is suppressed.

Similarly, when the vehicle is not in the turning state but the vehicle body BD starts to roll to the left as shown in FIG. 7A because of the front-right and rear-right wheels Wfr and Wrr riding over an obstacle on the road surface, for example, the processes in Steps S24 and S26 are executed like the case in which the vehicle starts to turn to the right. Therefore, at the right side where the vehicle body BD moves up by the roll of the vehicle, downward force is applied at the respective instant centers determined by the suspensions Sfr and Srr at the right side as shown in FIG. 7C. Further, at the left side where the vehicle body BD moves down by the roll of the vehicle, upward force is applied at the respective instant centers determined by the suspensions Sfl and Srl at the left side as shown in FIG. 7D. Consequently, the leftward roll of the vehicle body BD is suppressed.

Above, one embodiment of the present invention has been described, but the present invention is not limited to the above-described embodiment, and various changes are possible while still accomplishing the object of the present invention.

For example, in the above-described embodiment, the roll detecting means is composed of the lateral acceleration sensor 31 and Steps S12 and S14 where the roll angle RA of the vehicle body BD is calculated by using the lateral acceleration Gy detected by the lateral acceleration sensor 31. However, a roll angle detecting sensor for detecting the roll angle RA of the vehicle body BD may be disposed, and this roll angle detecting sensor can be used as the roll detecting means.

In the above-described embodiment, driving torques generated by the electric motors 21 and 22 corresponding to the front-left and rear-left wheels Wlf and Wrl and driving torques generated by the electric motors 23 and 24 corresponding to the front-right and rear-right wheels Wfr and Wrr are increased or decreased by the driving torque changing amount ΔTr upon the roll of the vehicle, thereby suppressing the roll of the vehicle. However, driving torques generated by the electric motors, which correspond to either one side front and rear wheels of the left side front and rear wheels Wfl, Wrl and the right side front and rear wheels Wfr, Wrr, may be increased or decreased by the driving torque changing amount ΔTr. Specifically, in the program shown in FIG. 3, either one of the processes in Step S20 and Step S22 may be omitted, and either one of the processes in Step S24 and S26 may be omitted.

In the above-described embodiment, the case was described in which the instant centers which are determined by the front suspensions Sfl and Sfr are located above and to the rear of the ground contact surfaces for the front wheels and in which the instant centers determined by the rear suspensions Srl and Srr are located above and forward of the ground contact surfaces for the rear wheels. However, the instant centers are not limited to these positions. For example, the instant centers determined by the front suspensions Sfl and Sfr may be located below and forward of the ground contact surfaces for the front wheels with the instant centers determined by the rear suspensions Srl and Srr being located below and to the rear of the ground contact surfaces for the rear wheels (first variation), or the instant centers determined by the front suspensions Sfl and Sfr may be located above and forward of the ground contact surfaces for the front wheels with the instant centers determined by the rear suspensions Srl and Srr being located above and to the rear of the ground contact surfaces for the rear wheels (second variation), or the instant centers determined by the front suspensions Sfl and Sfr may be located below and to the rear of the ground contact surfaces for the front wheels with the instant centers determined by the rear suspensions Srl and Srr being located below and forward of the ground contact surfaces for the rear wheels (third variation).

In this case, in the first variation, in the same manner as in the above-described embodiment, the driving torque generated by the electric motor corresponding to the front wheels at the side where the vehicle body BD moves up (the rear wheels at the side where the vehicle body BD moves down) is increased by the driving torque changing amount ΔTr in accordance with the roll angle RA of the vehicle body BD, and the driving torque generated by the electric motor corresponding to the rear wheels at the side where the vehicle body BD moves up (the front wheels at the side where the vehicle body BD moves down) is decreased by the driving torque changing amount ΔTr, whereby downward force can be generated at the respective instant centers determined by the suspensions at the side where the vehicle body BD moves up (upward force can be generated at the respective instant centers determined by the suspensions at the side where the vehicle body BD moves down).

In contrast, in the second and third variations, in the reverse of the above-described embodiment and the first variation, the driving torque generated by the electric motor corresponding to the front wheels at the side where the vehicle body BD moves up (the rear wheels at the side where the vehicle body BD moves down) is decreased by the driving torque changing amount ΔTr in accordance with the roll angle RA of the vehicle body BD, and the driving torque generated by the electric motor corresponding to the rear wheels at the side where the vehicle body BD moves up (the front wheels at the side where the vehicle body BD moves down) is increased by the driving torque changing amount ΔTr, whereby downward force can be generated at the respective instant centers determined by the suspensions at the side where the vehicle body BD moves up (upward force can be generated at the respective instant centers determined by the suspensions at the side where the vehicle body BD moves down).

What is claimed is:

1. A vehicle attitude control apparatus provided with four actuators which independently drive four wheels suspended on a vehicle body by a suspension apparatus and capable of controlling vehicle running attitude through the independent control of driving torques generated by the four actuators, the vehicle attitude control apparatus comprising:

roll detecting means that detects a roll of a vehicle; and driving torque control means that produces, in accordance with the detected vehicle roll, a difference in the driving torques generated by the actuators, corresponding to the front and rear wheels at the side where the vehicle body moves up due to the vehicle roll, such that forces are generated in the front and rear wheels, at the side where the vehicle body moves up, in opposite directions with respect to the fore and aft direction of the vehicle so that downward force is generated at the vehicle body that moves up, or produces a difference in the driving torques generated by the actuators, corresponding to the front and rear wheels at the side where the vehicle body moves down due to the vehicle roll, such that forces are generated in the front and rear wheels, at the side where the vehicle body moves down, in opposite directions with respect to the fore and aft direction of the vehicle so that upward force is generated at the vehicle body that moves down, thereby applying to the vehicle body force in the direction opposite to the roll.

2. A vehicle attitude control apparatus according to claim 1, wherein the roll detecting means detects a roll angle of the vehicle body; and driving torque control means comprises changing amount calculating means that calculates a changing amount for changing the driving torques generated by the actuators, corresponding to the front and rear wheels at the side where the vehicle body moves up or at the side where the vehicle body moves down, with the use of the detected roll angle of the vehicle body; driving torque calculating means that calculates the driving torques generated by the actuators, corresponding to the front and rear wheels at the side where the vehicle body moves up or at the side where the vehicle body moves down, with the use of the calculated changing amount; and drive control means that drives and controls the actuators, corresponding to the front and rear wheels at the side where the vehicle body moves up or at the side where the vehicle body moves down, in accordance with the calculated driving torques.

3. A vehicle attitude control apparatus according to claim 2, wherein
the roll detecting means comprises a lateral acceleration sensor that detects the lateral acceleration in the side-to-side direction of the vehicle; and roll angle calculating means that calculates the roll angle of the vehicle body in accordance with the detected lateral acceleration.

4. A vehicle attitude control apparatus according to claim 2, wherein
the changing amount for changing the driving torques increases with the increase in the detected roll angle of the vehicle body.

* * * * *